United States Patent Office 3,087,836
Patented Apr. 30, 1963

3,087,836
FLAMEPROOF PAPER AND PROCESS OF MAKING SAME
Robert J. Dearborn, Muncie, Ind., assignor to Hooker Chemical Corporation, Niagara Falls, N.Y., a corporation of New York
No Drawing. Filed Oct. 12, 1959, Ser. No. 845,596
8 Claims. (Cl. 117—136)

This invention relates to a process for the preparation of flame-retardant cellulosic paper and to the paper products produced thereby.

It is highly desirable to produce flame-retardant paper or paper products having considerable strength and stiffness and that are capable of being subjected to bending without rupture of the fibers. These paper products include flame-retardant laminated paper and carburetor air cleaner paper. Heretofore formulations for preparing flame-retardant paper or paper products either do not stiffen or strengthen the paper, or else the treated paper is rendered extremely brittle and unsatisfactory for many applications.

An additional disadvantage of the art formulations for rendering paper and paper products permanently flame-retardant has been the short storage life of the flame-proofing solutions. Long storage life is a long sought after ideal with obvious commercial advantages. Still further disadvantages of the art formulations are degradation of physical properties such as a loss of porosity, a loss of strength, a loss of flame retardance, etc., in the resultant flame-proofed paper when subjected to a wide variety of conditions. The latter is especially significant with paper used in filtering applications such as carburetor air cleaner paper.

It is therefore an object of the present invention to prepare flame-retardant paper and paper products.

It is a further object of the present invention to prepare stiff finished, flame-retardant paper and paper products having a high degree of strength, which paper is not rendered brittle by the flame-proofing process, and which paper may be subjected to bending without rupture of the fibers. This property is extremely important to give uniform physical properties for many applications where fabricated products of fluted design are desirable.

It is a still further object of the present invention to devise a simple and expeditious process for rendering paper and paper products permanently flame-retardant, which process is characterized by the utilization of a flame-proofing solution having long storage life and which process is also characterized by the use of a single treating solution.

It is a still further object of the present invention to prepare flame-retardant paper and paper products which retain their flame-retardant characteristics despite exposure to a wide variety of conditions, such as high humidity, direct contact with water and contact with solvents.

It is a particular object of the present invention to render filter paper and carburetor air cleaner paper flame-retardant, stiff finished, and flexible while still retaining its porosity.

Further objects and advantages of the present invention will appear hereinafter.

In accordance with the process of the present invention, I have found that cellulosic paper products can be rendered permanently flame-retardant while accomplishing the aforementioned objects by impregnating the paper to be treated with an aqueous solution consisting of:

| | Parts by weight |
|---|---|
| (1) Tetrakis(hydroxymethyl) phosphonium chloride | 10 to 30 |
| (2) Triethanolamine | 2 to 10 |
| (3) Vinyl chloride-vinylidene chloride copolymer latex | 10 to 50 |
| (4) Urea-formaldehyde precondensate | From zero to 75 | wherein the resin add-on is from about twenty to about forty percent by weight of the paper.

The above parts by weight are parts by weight of the non-aqueous ingredients and the water content is adjusted so that the above ingredients are present in from ten to fifty-five percent by weight of the total solution. For some applications flame-retardant paper and paper products having a lesser degree of stiffness are desired. This may be accomplished in accordance with the present invention, while still retaining the heretofore unobtainable excellent physical characteristcs by progressively diminishing the amount of urea-formaldehyde precondensate. In order to obtain the preferred stiff finish paper and paper products from thirty-five to fifty-five parts by weight of urea-formaldehyde precondensate is employed.

A preferred method for preparing the flame-proofing formulation is as follows: (1) tetrakis (hydroxymethyl) phosphonium chloride is dissolved in water and neutralized to pH 6±0.9 with triethanolamine; (2) a urea-formaldehyde precondensate is prepared by dissolving urea in thirty-seven percent formaldehyde solution and adding sufficient triethanolamine to render the solution basic (pH 7.5 to 8.5). After twelve to twenty-four hours at room temperature, additional urea is added; and (3) a vinyl chloride-vinylidene chloride copolymer latex containing approximately fifty percent solids is utilized. Solutions 1, 2 and 3 are mixed and diluted with water, if desired, to give a final solution containing ten to fifty-five percent by weight of resin forming ingredients.

An alternate method of preparing the urea-formaldehyde precondensate is to warm the solution of urea, formaldehyde and triethanolamine to sixty to eighty degrees centigrade, and maintain this temperature for a period of thirty to sixty minutes. The precondensate is then cooled to room temperature and the additional urea added.

The preferred method for treating paper is shown as follows:

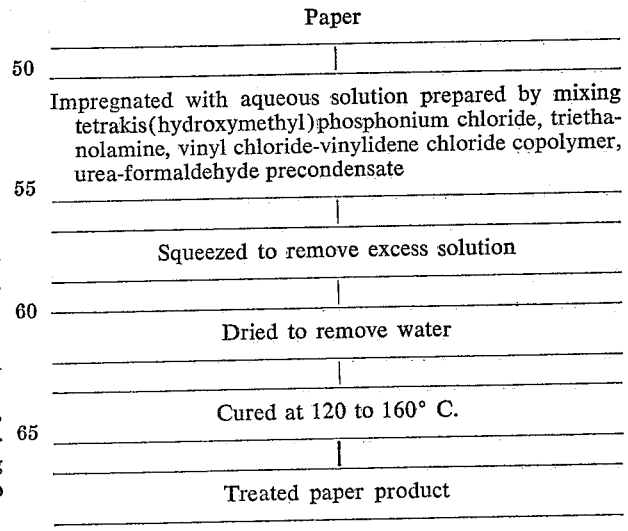

Best results are obtained if the paper is completely saturated with the resin solution by immersion and then passed through squeeze rolls. The resin solids content of the impregnating liquor will depend upon the absorbency of the paper, the squeeze roll setting and the resin add-on desired. An alternative method of applying the resin is to spray or otherwise coat the surface of the paper with the resin solution. The absorbent nature of the paper will cause the solution to penetrate the fibers throughout the paper. Other methods known to the art may be conveniently employed.

Drying and curing conditions may be varied from room temperature to elevated temperature, depending upon the type of paper and the equipment to be used. Conventional hot air ovens are generally satisfactory. Generally the resin will cure at room temperature over a period of weeks; at a temperature of from about one hundred and twenty degrees centigrade to about one hundred and sixty degrees centigrade the resin will cure in about two to fifteen minutes. Curing temperatures of above one hundred and sixty degrees centigrade have a tendency to degrade the cellulose and in general are to be avoided.

Proportion of ingredients may be varied within the wide limits heretofore set forth; however, it has been found that the best results are obtained utilizing an aqueous solution containing:

| | Parts by weight |
|---|---|
| (1) Tetrakis (hydroxymethyl) phosphonium chloride | 16 to 24 |
| (2) Triethanolamine | 3 to 5 |
| (3) Vinyl chloride-vinylidene chloride copolymer latex | 30 to 40 |
| (4) Urea-formaldehyde precondensate | 35 to 55 |

The urea-formaldehyde precondensate may be prepared from urea and formaldehyde in the ratio one mole urea to one mole formaldehyde up to one mole urea to two moles formaldehyde. Commercially available water-soluble urea-formaldehyde precondensates may be employed. The amount of additional urea added to the precondensate depends upon the amount of tetrakis (hydroxymethyl) phosphonium chloride to be used, and in every case the total urea-formaldehyde precondensate is within the aforementioned broad ranges, i.e., up to seventy-five parts by weight. Approximately one mole of additional urea is added per mole of tetrakis (hydroxymethyl) phosphonium chloride.

Paper treated with the formulation described above and containing from twenty to forty percent by weight of resin is flame resistant, flexible, and has a bursting strength up to five times the bursting strength of the untreated paper. The resin is not removed by immersing the paper in boiling water or organic solvents. The treated paper is also resistant to fungus attack, rot, mildew, etc. The resin is almost colorless and produces only a slight color change on white paper.

An additional advantage of the above formulation is that the mixture of ingredients is storage stable for at least three months, providing the concentration of resin-formers in water solution is from forty to sixty percent by weight. Should less concentrated solutions be employed in the impregnation of paper it is necessary to dilute the formulation prior to use. The dilute solutions are stable, however, for from twelve to forty-eight hours.

All of the ingredients used in the resin solution are soluble or can be dispersed in water; hence, the use of toxic and flammable solvents is not required. The ingredients are also soluble in the lower alcohols; such as, for example, methyl alcohol, ethyl alcohol and isopropyl alcohol.

The following are examples of the process of the present invention. These examples are not to be taken as limitative but merely illustrative.

EXAMPLE 1

To sixty grams of thirty-five percent formaldehyde solution containing twenty-one grams of formaldehyde was added thirty-five grams of urea and sixteen grams of water. The solution was adjusted to a pH of 7.8 by the addition of one gram of fifty percent aqueous triethanolamine and allowed to stand for fifteen hours at room temperature. A solution of sixteen grams of urea in sixteen grams of water was added. Tetrakis (hydroxymethyl) phosphonium chloride, forty-five grams, in fifty-four grams of water was treated with nine grams triethanolamine and added to the urea-formaldehyde solution. Finally, one hundred grams of fifty percent vinyl chloride-vinylidene chloride copolymer latex was stirred in to give three hundred and fifty-one grams of a fifty percent solution of resin-forming ingredients. This solution was diluted with three hundred and fifty-one grams of water and sheets of carburator air cleaner paper were immersed in the liquid. The sheets were squeezed by means of a heavy roller until the wet pick-up was between two hundred and two hundred and seventy-five percent. The papers were dried at eighty degrees centigrade and cured for five minutes at one hundred and fifty degrees centigrade. The cured sheets contained from thirty to thirty-five percent by weight of resin and showed a bursting strength of twenty-one to twenty-three pounds per square inch as measured on the Mullen paper tester. By comparison, the untreated paper showed a bursting strength of six pounds per square inch. The treated paper was completely flame resistant and could be fluted through a one hundred and eighty degree angle without breaking. A sheet of paper containing 35.3 percent resin was immersed in boiling water for ten minutes and dried. The resin content was now 32.6 percent and the Mullen bursting strength was 19.5 pounds per square inch. Subsequent washings produced little loss of resin.

EXAMPLE 2

Solutions of urea-formaldehyde and tetrakis (hydroxymethyl) phosphonium chloride-triethanolamine were prepared as described in Example 1. These solutions were prepared to described in Example 1. These solutions were mixed and one hundred and fifty grams of vinyl chloride-vinylidene chloride copolymer latex added. After dilution to twenty-five percent concentration the solution was employed to impregnate carburator air cleaner paper and the paper dried and cured as described above. Samples of the paper containing thirty-one to thirty-five percent resin were found to have a bursting strength of twenty-two to twenty-five pounds per square inch and were flexible and flame resistant. A sheet of paper containing 31.9 percent resin was immersed in boiling water for ten minutes and dried. The resin content was now 28.5 percent. The Mullen bursting strength was twenty-three pounds per square inch and the paper was completely flame resistant. Subsequent washings produced little loss of resin.

EXAMPLE 3

Solutions of urea-formaldehyde and tetrakis (hydroxymethyl) phosphonium chloride-triethanolamine were prepared as described in Example 1. These solutions were mixed and one hundred and twenty-five grams of vinyl chloride-vinylidene chloride copolymer latex added. The solution, containing fifty percent solids, was allowed to stand for ninety days. At the end of this time no coagulation or precipitation of polymer could be observed.

Examples 4 through 18 compare the properties of paper treated in accordance with the present invention (Examples 4 through 8) with paper treated in accordance with an art formulation for flameproofing with tetrakis (hydroxymethyl) phosphonium chloride (Examples 9 through 13) and with paper treated in accordance with an art formulation for flameproofing with tetrakis (hydroxymethyl) phosphonium chloride with the exception that vinyl chloride copolymer latex is added (Examples 14 through 18).

The formulations used in Examples 4–18 are given below in Table I, wherein the numerical designations indicate percentage of that ingredient exclusive of water.

Table I

| | Tetrakis (hydroxymethyl) phosphonium chloride | Triethanolamine | Urea | Formaldehyde | Trimethylol melamine | Latex |
|---|---|---|---|---|---|---|
| Formulation I | 24.10 | 4.81 | 26.72 | 11.23 | | 33.30 |
| Formulation II | 42.40 | 7.70 | 25.40 | | 24.40 | |
| Formulation III | 27.25 | 5.45 | 10.30 | | 23.60 | 33.30 |

In Table II the Mullen burst strength was determined by taking two readings on each side of the paper. The untreated paper had a strength of six p.s.i. The Gurley stiffness was taken in two directions, machine direction (MD) and cross machine direction (CD). The machine direction of the untreated paper was 690–850 mg., and the cross machine direction was 380–540. The bending property was determined by placing a one inch wide strip of paper to be tested on a flat surface, along a ruled edge (in inches). The strip is bent back evenly over itself, being careful not to crease the paper. A cylindrical roller (one-quarter to one-half inch in diameter) is then laid on the cut ends of the paper and slowly rolled towards the bend, keeping an even downward pressure on the roller. When the roller is a certain distance from the bend of the paper, the fibres of the paper will start to break, and/or a permanent crease will be formed in the paper. The distance from the bottom point of the roller to the position the creased edge of the paper would occupy if it were fully creased when the fibres start to break or when the paper creases, is the measurement of the test. The distance from the starting point of the roller to the fully creased edge of the paper is equal to one-half the length of the strip of paper used. This test is a measure of the suitability of the paper for those applications which require fluting of the paper. The lower the measurement, the better the paper is with respect to the bending property. The flame test was taken by holding a one-inch strip in a luminous Bunsen flame.

of equivalency of the claims are intended to be embraced therein.

I claim:
1. A flexible, flame-retardant paper having a resinous coating which comprises the reaction product of: (A) from ten to thirty parts by weight of tetrakis (hydroxymethyl) phosphonium chloride, (B) from two to ten parts by weight of triethanolamine, (C) from ten to fifty parts by weight of vinyl chloride-vinylidene chloride copolymer latex, and (D) up to seventy-five parts by weight of urea-formaldehyde precondensate; wherein the resin add-on is from about twenty to about forty percent by weight of the paper.

2. A stiff, flexible, flame-retardant paper having a resinous coating which comprises the reaction product of: (A) from ten to thirty parts by weight of tetrakis (hydroxymethyl) phosphonium chloride, (B) from two to ten parts by weight of triethanolamine, (C) from ten to fifty parts by weight of vinyl chloride-vinylidene chloride copolymer latex, and (D) from thirty-five to fifty-five parts by weight of urea-formaldehyde precondensate; wherein the resin add-on is from about twenty to about forty percent by weight of the paper.

3. A stiff, flexible, flame-retardant paper having a resinous coating which comprises the reaction product of: (A) from sixteen to twenty-four parts by weight of tetrakis (hydroxymethyl) phosphonium chloride, (B) from three to five parts by weight of triethanolamine, (C) from thirty to forty parts by weight of vinyl chloride-vinylidene chloride copolymer latex, and (D) from thirty-five to fifty-five parts by weight of urea-formaldehyde precondensate; wherein the resin add-on is from about twenty to about forty percent by weight of the paper.

4. A porous, stiff, flexible, flame-retardant filter paper

Table II

| Example | Formulation | Cured resin Content, percent | Mullen burst strength, p.s.i. | Gurley stiffness | | Bending property | Flame test | Percent phos. on Paper (calc.) |
|---|---|---|---|---|---|---|---|---|
| | | | | MD, mg. | CD, mg. | | | |
| 4 | I | 27.5 | 21, 25, 24, 25 | 2,700 | 1,867 | 1.5 | Good | 1.075 |
| 5 | I | 30.2 | 25, 26, 22, 31 | 3,120 | 1,770 | 1.75–2.0 | Fair | 1.18 |
| 6 | I | 31.6 | 25, 27, 27, 29 | 3,289 | 2,000 | 1.5–2.0 | Excellent | 1.235 |
| 7 | I | 32.8 | 28, 30, 29, 30 | 3,645 | 2,400 | 0.75–1.0 | do | 1.28 |
| 8 | I | 35.9 | 29, 33, 32, 34 | 3,550 | 2,080 | 1.25–1.5 | do | 1.403 |
| 9 | II | 28.9 | 10, 11, 10, 12 | 3,467 | 2,875 | >5 | do | 1.79 |
| 10 | II | 33.6 | 10, 13, 11, 12 | 4,356 | 3,023 | 2.75–3.0 | do | 2.32 |
| 11 | II | 34.9 | 13, 13, 13, 13 | 6,035 | 4,089 | >5 | do | 2.41 |
| 12 | II | 36.2 | 12, 12, 13, 14 | 5,245 | 3,378 | 3.75–4.0 | do | 2.49 |
| 13 | II | 38.5 | 12, 13, 13, 14 | 5,990 | 4,801 | 4.0–4.5 | do | 2.65 |
| 14 | III | 29.4 | 16, 17, 18, 19 | 3,289 | 2,220 | 2.5–3.0 | good | 1.30 |
| 15 | III | 30.1 | 18, 19, 18, 21 | 3,112 | 2,134 | 2.0–2.5 | Excellent | 1.33 |
| 16 | III | 31.4 | 18, 19, 20, 22 | 3,220 | 2,440 | 2.25–3.0 | do | 1.39 |
| 17 | III | 31.9 | 21, 21, 20 | 3,560 | 2,140 | | do | 1.415 |
| 18 | III | 34.6 | 14, 15, 14, 16 | 3,820 | 2,756 | 4.0–4.5 | do | 1.53 |

This invention may be embodied in other forms or carried out in other ways without departing from the spirit or essential characteristics thereof. The present embodiment of the invention is, therefore, to be considered as in all respects illustrative, and not restrictive, the scope of the invention being indicated by the appended claims, and all changes which come within the meaning and range having a resinous coating which comprises the reaction product of (A) from sixteen to twenty-four parts by weight of tetrakis (hydroxymethyl) phosphonium chloride, (B) from three to five parts by weight of triethanolamine, (C) from thirty to forty parts by weight of vinyl chloride-vinylidene chloride copolymer latex, and (D) from thirty-five to fifty-five parts by weight of urea-formaldehyde precondensate; wherein the resin add-on is from about twenty to about forty percent by weight of the paper.

5. A process for preparing flexible, flame-retardant paper and paper products which comprises: (I) impregnating the paper to be treated with an aqueous solution prepared by mixing together components comprising (A) from ten to thirty parts by weight of tetrakis (hydroxymethyl)phosphonium chloride, (B) from two to ten parts by weight of triethanolamine, (C) from ten to fifty parts by weight of vinyl chloride-vinylidene chloride copolymer latex, and (D) up to seventy-five parts by weight of urea-formaldehyde precondensate; (II) drying the treated paper; and (III) curing the treated paper.

6. The process for preparing stiff, flexible, flame-retardant paper and paper products which comprises: (I) impregnating the paper to be treated with an aqueous solution prepared by mixing together components comprising (A) from ten to thirty parts by weight of tetrakis (hydroxymethyl)phosphonium chloride, (B) from two to ten parts by weight of triethanolamine, (C) from ten to fifty parts by weight of vinyl chloride-vinylidene chloride copolymer latex, and (D) from thirty-five to fifty-five parts by weight of urea-formaldehyde precondensate; (II) drying the treated paper at an elevated temperature; and (III) subjecting the treated paper to an elevated temperature and thereby effecting a curing of the treated paper.

7. A process for preparing stiff, flexible, flame-retardant paper and paper products which comprises: (I) impregnating the paper to be treated with an aqueous solution prepared by mixing together components comprising (A) from sixteen to twenty-four parts by weight of tetrakis (hydroxymethyl)phosphonium chloride, (B) from three to five parts by weight of triethanolamine, (C) from thirty to forty parts by weight of vinyl chloride-vinylidene chloride copolymer latex, and (D) from thirty-five to fifty-five parts by weight of urea formaldehyde precondensate; (II) drying the treated paper at an elevated temperature; and (III) curing the treated paper at a temperature of from one hundred and twenty to one hundred and sixty degrees centigrade for from two to fifteen minutes.

8. A process for preparing porous, stiff, flexible, flame-retardant filter paper which comprises: (I) impregnating the paper to be treated with an aqueous solution prepared by mixing together components comprising (A) from sixteen to twenty-four parts by weight of tetrakis (hydroxymethyl)phosphonium chloride, (B) from three to five parts by weight of triethanolamine, (C) from thirty to forty parts by weight of vinyl chloride-vinylidene chloride copolymer latex, and (D) from thirty-five to fifty-five parts by weight of urea-formaldehyde precondensate; (II) drying the treated paper at an elevated temperature; and (III) curing the treated paper at a temperature of from one hundred and twenty to one hundred and sixty degrees centigrade for from two to fifteen minutes; wherein the cured paper contains at least twenty percent resin add-on.

References Cited in the file of this patent

UNITED STATES PATENTS

| | | |
|---|---|---|
| 2,684,953 | Stilbert et al. | July 27, 1954 |
| 2,809,941 | Reeves et al. | Oct. 15, 1957 |
| 2,810,701 | Reeves et al. | Oct. 22, 1957 |
| 2,955,958 | Brown | Oct. 11, 1960 |

OTHER REFERENCES

Reeves et al.: "Flameproofing of Cotton With THPC-Resins," A.I.C., 364, pages 1 to 8, November 2, 1953.

Skinner: "Fire Resistance Properties of PVC and Related Polymers," Rubber and Plastics Age, March 1956 (pp. 169–172 relied on).

Hooker Electrochemical Co., "THPC Process for Production of Permanent Fire-Retardant Paper," Bulletin No. 170 (1958).